US012308026B2

United States Patent
Zhao et al.

(10) Patent No.: US 12,308,026 B2
(45) Date of Patent: May 20, 2025

(54) VEHICLE AVATAR DEVICES FOR INTERACTIVE VIRTUAL ASSISTANT

(71) Applicant: Cerence Operating Company, Burlington, MA (US)

(72) Inventors: Shenbin Zhao, Shanghai (CN); Jianchao Lin, Shanghai (CN); Nan Li, Beijing (CN); David Yu, Shanghai (CN); Lei Shiah, Shanghai (CN); Chien-Pang Lin, New Taipei (TW); Bruno Xu, Beijing (CN); Feng Xia, Chengdu (CN); Feng Liu, Shanghai (CN)

(73) Assignee: Cerence Operating Company, Burlington, MA (US)

( * ) Notice: Subject to any disclaimer, the term of this patent is extended or adjusted under 35 U.S.C. 154(b) by 402 days.

(21) Appl. No.: 17/684,529

(22) Filed: Mar. 2, 2022

(65) Prior Publication Data

US 2023/0012342 A1    Jan. 12, 2023

Related U.S. Application Data

(63) Continuation of application No. PCT/CN2019/104012, filed on Sep. 2, 2019.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 25/63* (2013.01); *H04R 1/406* (2013.01);
(Continued)

(58) Field of Classification Search
CPC .............. G06F 3/167; G06F 2203/0381; G06F 2203/04803; G06F 3/0484;
(Continued)

(56) References Cited

U.S. PATENT DOCUMENTS 4,397,635 A * 8/1983 Samuels ................ G09B 17/00
434/308
7,297,929 B2 * 11/2007 Cernasov ................. G01J 1/04
250/214 R (Continued)

FOREIGN PATENT DOCUMENTS

CN    103678456 A    3/2014
CN    106828102 A    6/2017
(Continued)

OTHER PUBLICATIONS

Extended European Search Report, European Application No. 19944239.3, mailed Apr. 20, 2023 (13 pages).

(Continued)

*Primary Examiner* — Jakieda R Jackson
(74) *Attorney, Agent, or Firm* — Occhiuti & Rohlicek LLP (57) ABSTRACT

A system and method for providing avatar device status indicators for voice assistants in multi-zone vehicles. The method comprises: receiving at least one signal from a plurality of microphones, wherein each microphone is associated with one of a plurality of spatial zones, and one of a plurality of avatar devices; wherein the at least one signal further comprises a speech signal component from a speaker; wherein the speech signal component is a voice command or question; sending zone information associated with the speaker and with one of the plurality of spatial (Continued)

zones to an avatar; activating one the plurality of avatar devices in a respective one of the plurality of spatial zones associated with the speaker.

20 Claims, 4 Drawing Sheets (51) Int. Cl.
*G10L 25/63* (2013.01)
*H04R 1/40* (2006.01)
*H04R 3/00* (2006.01)
*H05B 47/12* (2020.01)
*B60Q 9/00* (2006.01)
*G01C 21/36* (2006.01)

(52) U.S. Cl.
CPC .............. *H04R 3/005* (2013.01); *H05B 47/12* (2020.01); *B60Q 9/00* (2013.01); *G01C 21/3629* (2013.01); *G10L 2015/223* (2013.01); *H04R 2499/13* (2013.01)

(58) Field of Classification Search
CPC .............. G06F 2203/011; G06F 40/30; G06F 16/5838; G06F 21/32; G10L 15/22; G10L 2015/223; G10L 15/34; G10L 2021/02166; G10L 2015/088; H04N 21/41422; H04N 21/42202; H04N 21/44218
See application file for complete search history.

(56) References Cited

U.S. PATENT DOCUMENTS

| | | | | |
|---|---|---|---|---|
| 9,786,294 B1* | 10/2017 | Bezos | ................... | G06F 3/165 |
| 9,881,632 B1* | 1/2018 | Every | ................... | H04R 3/005 |
| 10,181,323 B2* | 1/2019 | Beckhardt | .............. | G06F 3/167 |
| 10,185,544 B1* | 1/2019 | Mutagi | ................... | G06F 3/167 |
| 10,289,152 B1* | 5/2019 | Cheng | ................... | G06F 1/1684 |
| 10,346,541 B1* | 7/2019 | Phillips | ................... | G06F 3/011 |
| 10,372,130 B1* | 8/2019 | Kaushansky | .......... | B60K 35/26 |
| 10,999,419 B1* | 5/2021 | Willis | ................... | G06F 16/68 |
| 11,070,911 B2* | 7/2021 | Groene | ................... | H04S 7/301 |
| 2004/0095851 A1* | 5/2004 | Ellner | ................... | G04G 17/08 |
| | | | | 368/281 |
| 2009/0110246 A1* | 4/2009 | Olsson | ................ | H04M 1/72427 |
| | | | | 382/118 |
| 2011/0246916 A1* | 10/2011 | Leskela | ................ | G06F 3/0488 |
| | | | | 345/173 |
| 2013/0337762 A1* | 12/2013 | Buch | ...................... | H04W 4/44 |
| | | | | 455/404.1 |
| 2014/0074480 A1 | 3/2014 | Gratke et al. | | |
| 2014/0121982 A1* | 5/2014 | Rauhala | ................ | A61B 5/6898 |
| | | | | 702/19 |
| 2014/0132390 A1* | 5/2014 | Loveland | ............ | H05B 47/115 |
| | | | | 340/5.8 |
| 2015/0332532 A1* | 11/2015 | Lee | .................... | G07C 9/00658 |
| | | | | 340/5.72 |
| 2015/0340040 A1* | 11/2015 | Mun | ....................... | G10L 17/22 |
| | | | | 704/246 |
| 2016/0039356 A1* | 2/2016 | Talwar | ..................... | H04R 3/00 |
| | | | | 381/86 |
| 2016/0089954 A1* | 3/2016 | Rojas Villanueva | ...................... | |
| | | | | B60H 1/00742 |
| | | | | 701/36 |
| 2016/0234206 A1* | 8/2016 | Tunnell | ............... | H04L 63/0428 |
| 2016/0242263 A1* | 8/2016 | Engelen | ............... | H05B 47/175 |
| 2016/0373269 A1* | 12/2016 | Okubo | ................. | H04L 12/282 |
| 2016/0378286 A1* | 12/2016 | Ke | ...................... | G06F 3/04886 |
| | | | | 715/764 |
| 2017/0000348 A1 | 1/2017 | Karsten | ............. | G06Q 10/1093 |
| 2017/0057437 A1* | 3/2017 | Buttolo | ................. | B60R 16/037 |
| 2017/0061955 A1* | 3/2017 | Gueta | ................. | H04M 1/724 |
| 2017/0083285 A1* | 3/2017 | Meyers | ................. | G10L 15/222 |
| 2017/0147074 A1* | 5/2017 | Buttolo | .................... | B60N 2/02 |
| 2017/0176198 A1* | 6/2017 | Tatourian | ........... | G01C 21/3453 |
| 2017/0177721 A1* | 6/2017 | Prabhu | .................. | G06F 16/951 |
| 2017/0330551 A1* | 11/2017 | Zafeiropoulos | .. | G10K 11/17879 |
| 2018/0089310 A1* | 3/2018 | Barsness | ............. | G06F 16/3344 |
| 2018/0097323 A1* | 4/2018 | Tak | ...................... | G06F 1/1632 |
| 2018/0122372 A1* | 5/2018 | Wanderlust | ............. | G10L 15/22 |
| 2018/0137780 A1* | 5/2018 | Toliver | .................... | G09B 19/167 |
| 2018/0174457 A1* | 6/2018 | Taylor | .................... | G06N 3/045 |
| 2018/0189581 A1* | 7/2018 | Turcot | .................. | G06V 20/597 |
| 2018/0190307 A1* | 7/2018 | Hetherington | .......... | G10L 15/20 |
| 2018/0204570 A1* | 7/2018 | Puranik | ............ | H04N 21/44218 |
| 2018/0226077 A1* | 8/2018 | Choi | ..................... | B60R 16/023 |
| 2019/0057703 A1 | 2/2019 | Zeinstra | | |
| 2019/0108837 A1* | 4/2019 | Christoph | ............... | G10L 15/22 |
| 2019/0206407 A1* | 7/2019 | Shukla | ..................... | G10L 15/24 |
| 2019/0377056 A1* | 12/2019 | Dudyala | ................. | G01S 3/808 |
| 2020/0184964 A1* | 6/2020 | Myers | ..................... | G06F 3/165 |
| 2020/0214112 A1* | 7/2020 | Magielse | ................ | G10L 15/22 |
| 2020/0380967 A1* | 12/2020 | Matheja | ................. | H04R 1/406 |
| 2020/0382863 A1* | 12/2020 | Matheja | ................. | G10L 25/78 |
| 2021/0266661 A1* | 8/2021 | Winton | ................... | B60K 35/80 |
| 2021/0297776 A1* | 9/2021 | Zhang | ................... | G10L 21/0208 |

FOREIGN PATENT DOCUMENTS

| | | |
|---|---|---|
| CN | 206426859 U | 8/2017 |
| CN | 108128238 A | 6/2018 |
| EP | 1748636 A1 | 1/2007 |
| IN | 1689073 A | 10/2005 |
| WO | 2013172827 A1 | 11/2013 |

OTHER PUBLICATIONS

International Search Report, PCT Application No. PCT/CN2019/104012, mailed Jun. 8, 2020 (5 pages).

* cited by examiner

VEHICLE AVATAR DEVICES FOR INTERACTIVE VIRTUAL ASSISTANT

CROSS-REFERENCE TO RELATED APPLICATIONS

This Application is a continuation of International Application No. PCT/CN2019/104012, filed on Sep. 2, 2019. The content of aforementioned application is incorporated herein by reference in its entirety.

DISCUSSION OF RELATED ART

1. Field of the Disclosure

The present disclosure relates to virtual assistants employed in vehicles.

2. Description of the Related Art

Modern vehicles are equipped with multi-zone systems to allow various passengers to take advantage of voice-activated features or engage in hands-free telephone conversations in different areas of the vehicle. In systems where each person speaking (hereinafter: "speaker") has a dedicated zone close to the respective person's position, it can be difficult for a speaker and driver to know if the voice assistant has properly identified which zone the speaker is in, and what the current status of the voice assistant is. For example, current practices require a speaker, who is often the driver of a vehicle, to quickly look at small display screens to obtain information, thereby taking their eyes off the road.

These problems can lead to the speaker driving dangerously, needlessly repeating themselves, waiting to speak, or speaking at the wrong time to issue a command or request to the voice assistant.

SUMMARY

The aforementioned and related problems can be solved by a system and method that provides a sensory status indicator for the voice assistant which is highly visible or readily identifiable with minimal concentration needed from a speaker.

The present disclosure provides a system and a method in which avatar devices are used to indicate the status of a voice assistant. Avatar devices can be visual avatars, such as LED lighting, or other sensory avatar devices, including haptic avatars, such as a vibrating device.

In an embodiment, the present disclosure provides a system and a method in which the avatar devices are LEDs are used to indicate the status of a voice assistant. As used herein, LEDs can be employed to indicate the active area or zone of a voice assistant, indicate the status of the voice assistant and the emotion of the voice assistant. The speakers, whether passengers or drivers, can quickly obtain information at a glance, or through peripheral vision, thereby increasing safety, and ease of use of the vehicle's systems and voice assistant.

In multi-zone vehicles, with a zone per seat, and with multiple speakers in different zones, the LEDs can be used to indicate that a voice assistant is listening to or waiting for a command in a particular zone or seat. When the LED is turned on in a particular zone, the speaker or speakers in the vehicle are made aware which zone in the vehicle the voice assistant is currently active in. When the LED is turned off the speaker is made aware that the voice assistant is no longer active in that zone.

LEDs can also be used to indicate the current status of a voice assistant in the active zone. For example, different LED effects can be used to indicate that the voice assistant is idle, listening, processing or snoozing. For instance, LEDs can be turned off to indicate an idle voice assistant status, and the LED can be turned on with low brightness to indicate a listening voice assistant status.

Lastly, LEDs can be used to indicate an emotion status of the voice assistant. For example, a blue light can be used to indicate that the voice assistant is calm, and a red light can indicate the voice assistant is angry. These indicators facilitate communication and understanding between the voice assistant and the speaker by providing the voice assistant more human like features.

BRIEF DESCRIPTION OF THE DRAWINGS

The accompanying drawings illustrate aspects of the present disclosure, and together with the general description given above and the detailed description given below, explain the principles of the present disclosure. As shown throughout the drawings, like reference numerals designate like or corresponding parts.

DETAILED DESCRIPTION OF THE DISCLOSURE

Referring to the drawings and, in particular, to FIGS. 1, 2A-2B and 3, a system is generally represented by reference numeral 100, hereinafter "system 100". System 100 is a multi-microphone system used to capture speech sound from multiple persons in an example environment 10, such as a vehicle in FIG. 1. As will be appreciated, embodiments as described herein can be employed in other exemplary multi zone to person environments, for example a conference room.

Figure 1:
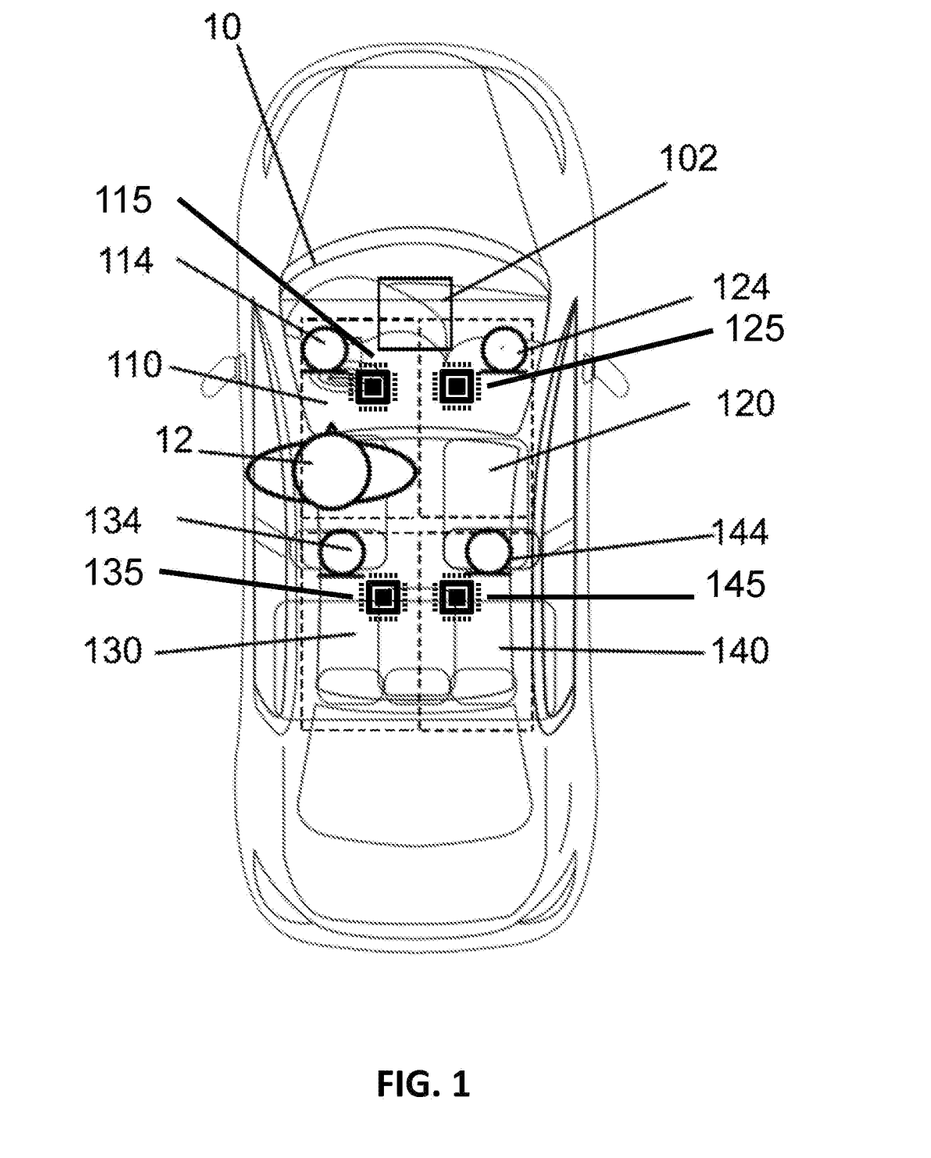
FIG. 1 shows an exemplary vehicular environment for an exemplary system and method according to the present disclosure.

Environment 10 can include spatial zones 110, 120, 130, and 140, having microphones 114, 124, 134, and 144, respectively. Microphones 114, 124, 134, and 144 are arranged such that different spatial zones 110, 120, 130, and 140 are covered by each respective microphone. Specifically, microphones 114, 124, 134, and 144 are spatially separated so that each spatial zone is defined by the proximity to the corresponding microphone. This is also referred to as an "acoustic bubble" around the microphone. Specifically, microphones 114, 124, 134, and 144 are spatially separated so that each spatial zone is defined by the proximity to the corresponding microphone.

Environment 10 can also include spatial zones 110, 120, 130, and 140, having avatars 115, 125, 135, and 145, respectively. Avatars 115, 125, 135, and 145 are arranged such that different spatial zones 110, 120, 130, and 140 are covered by each respective avatar. In the embodiments as described herein, avatars 115, 125, 135, and 145 are described as lighting devices corresponding to each spatial zone, for example an LED light or LED strip.

Spatial zones 110, 120, 130, and 140 are indicated by the respective dashed boundary lines. The dashed lines are for illustrative purposes only and are not intended to limit the relative sizes and/or dispositions within environment 10.

In FIG. 1, microphone 114 is in spatial zone 110, microphone 124 is in spatial zone 120, microphone 134 is in spatial zone 130, and microphone 144 is in spatial zone 140. In FIG. 1, LED 115 is in spatial zone 110, LED 125 is in spatial zone 120, LED 135 is in spatial zone 130, and LED 145 is in spatial zone 140. User 12 is shown sitting in the driver seat, in zone 110.

Although four spatial zones are shown in environment 10, the system and method of the present disclosure is operable in an environment with at least two zones. For example, in a vehicular environment, there can be one seat-dedicated microphone 114 and LED strip 115 for zone 110 and a second seat-dedicated microphone 124 and LED strip 125 for zone 120. Such a configuration corresponds to one microphone and LED avatar for the driver's seat and one microphone and LED avatar for the front passenger's seat.

Although each of spatial zones 110, 120, 130 and 140 is shown in the figures to include a single microphone, each zone can include multiple microphones or an array of microphones to focus on the related speaker in each zone. That is, although microphone 114 is shown and described as one microphone, for example, microphone 114 can be an array of microphones. Advantageously, such an arrangement allows for techniques such as beamforming. Examples can also comprise virtual microphones. A virtual microphone as used herein is understood to be a combination of multiple physical microphones in an array of microphones dedicated to a single spatial zone and the processing and determining of one output signal therefrom. Beamforming techniques to determine one output signal are examples. This output signal associated to the array of microphones and designated as the output signal of a virtual microphone, can focus on one dedicated zone similar to a single omni-directional microphone positioned close to a speaker in a particular zone, or similar to a directional microphone steered towards the desired zone or rather speaker.

Although each of spatial zones 110, 120, 130 and 140 is shown in the figures to include a single LED or LED strip, each zone can include multiple LEDs or LED strips. Also, while the terms "avatar" and "LED" or "LED strip" are used interchangeably herein, an avatar can include other devices providing visual cues or lighting that can correspond uniquely to a different zone. As will also be appreciated, while avatars are described as visual avatars, other sensory avatar devices that do not distract a driver can be used. For example, avatars 115, 125, 135, and 145 can haptic avatars, such as a vibrating element embedded in each seat.

It will further be understood that environments such as environment 10 can have more than four spatial zones as long as each zone has at least one microphone and one avatar. For example, a sports utility vehicle with seating for six passengers can be outfitted with six microphones and six LED strips for 6 zones corresponding to six seats. So again, for a van having twelve seats (12 zones, 12 microphones, 12 LED strips), a bus having sixty seats (60 zones, 60 microphones, 60 LED strips), and so on.

Figure 2A:
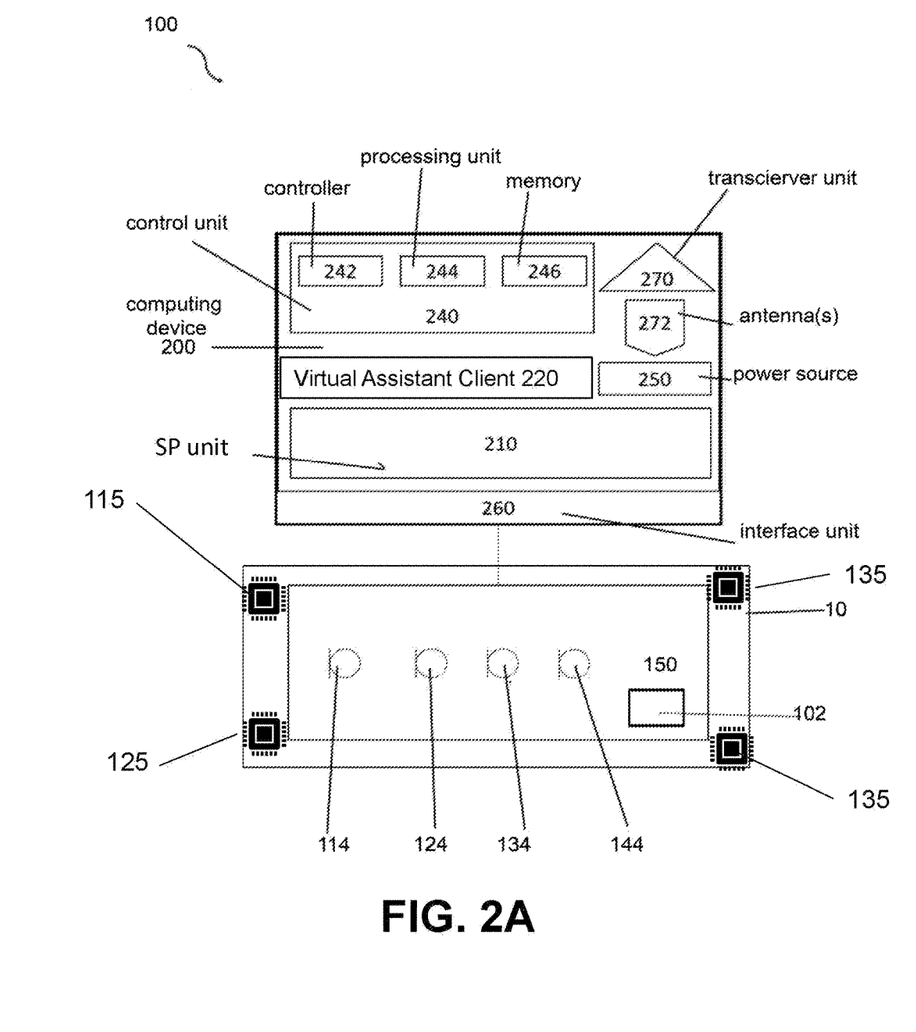
FIG. 2A shows an embodiment of the system according to the present disclosure.
Figure 2B:
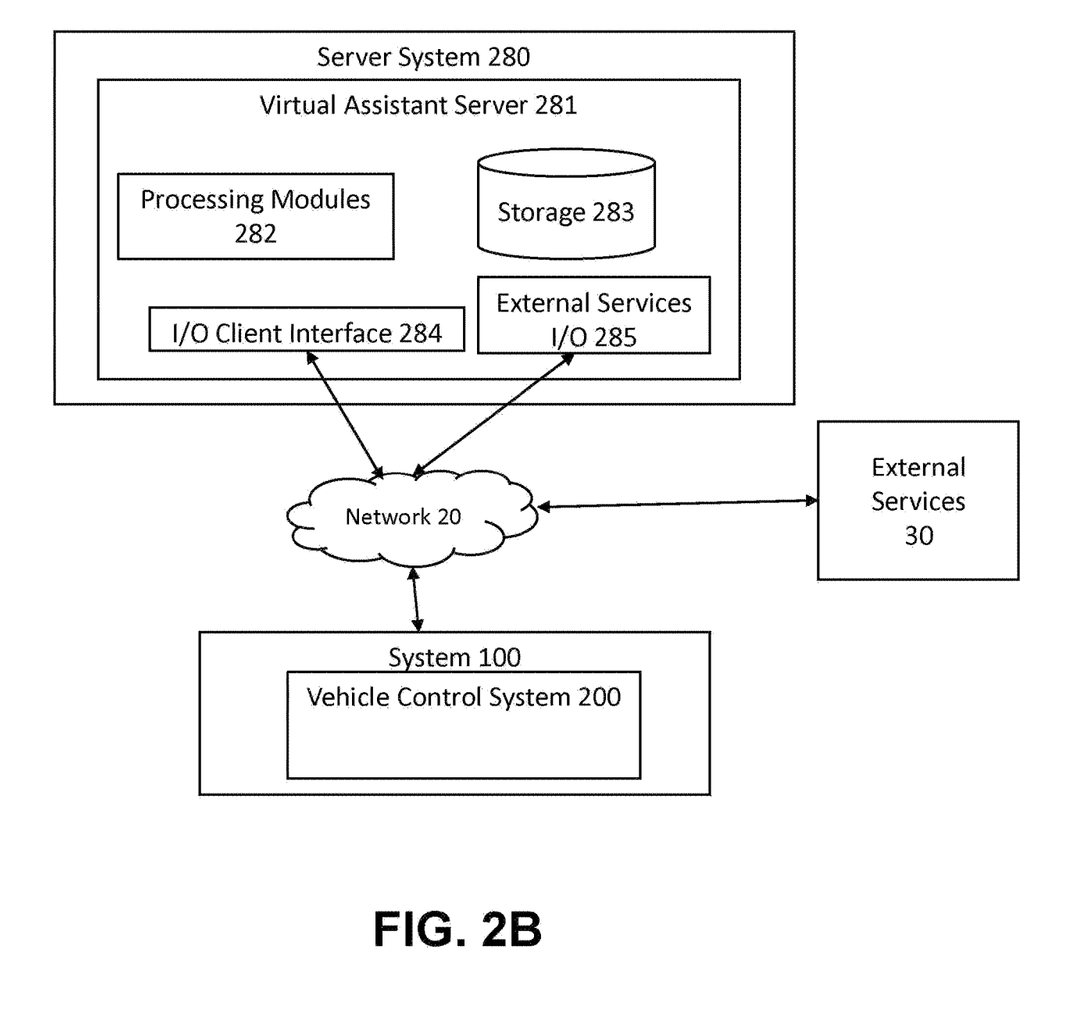
FIG. 2B shows a system for a virtual assistant according to a client-server model.

Referring to FIGS. 2A-2B, example components of system 100 will now be discussed.

System 100 includes the following exemplary components that are electrically and/or communicatively connected: a sound reproducer 102 (FIG. 1); a first microphone 114; a first LED strip 115, a second microphone 124; a second LED strip 125, a third microphone 134; a third LED strip 135; a fourth microphone 144; a fourth LED strip 145; and a computing unit 200. Computing unit 200 can include the following: a virtual assistant client 220; a signal processing (SP) unit 210; a control unit 240, which can be configured to include a controller 242, a processing unit 244 and/or a non-transitory memory 246; a power source 250 (e.g., battery or AC-DC converter); an interface unit 260, which can be configured as an interface for external power connection and/or external data connection; a transceiver unit 270 for wireless communication; and antenna(s) 272. The components of computing unit 200 can be implemented in a distributed manner.

SP unit 210 performs gain estimation and application, speaker activity detection, and multi-channel signal processing.

Sound reproducer 102 is an electromechanical device that produces sound, also known as a loudspeaker. The location shown for sound reproducer 102 in FIG. 1 is for illustrative purposes only. In embodiments, there can be one or more sound reproducers 102.

Microphones 114, 124, 134, and 144 are transducers that convert sound into an electrical signal. Typically, a microphone utilizes a diaphragm that converts sound to mechanical motion that is in turn converted to an electrical signal.

Several types of microphones exist that use different techniques to convert, for example, air pressure variations of a sound wave into an electrical signal. Nonlimiting examples include: dynamic microphones that use a coil of wire suspended in a magnetic field; condenser microphones that use a vibrating diaphragm as a capacitor plate; and piezoelectric microphones that use a crystal of made of piezoelectric material. A microphone according to the present disclosure can also include a radio transmitter and receiver for wireless applications.

Microphones 114, 124, 134, and 144 can be directional micro-phones (e.g. cardioid microphones) so that focus on a spatial zone is emphasized. An omni-directional microphone can also focus on one zone by its position within the zone close to the desired speaker. Microphone 114 can be one or more microphones or microphone arrays. Microphones 124, 134, and 144 can also be one or more microphones or microphone arrays.

Sound reproducer 102 and microphones 114, 124, 134, and 144 can be disposed in one or more enclosures 150.

Detecting in which zone of at least two zones a person is speaking based on multiple microphone signals can be done, e.g., by evaluating the speech power occurring at a microphone in each of the at least two zones.

The system can be configured to perform of multi-zone processing (e.g., for separation, combination, or zone selection) using, for example, the observation of level differences of the different microphone signals. For each passenger speaking it is assumed that the passenger-dedicated microphone for the respective passenger's seat shows higher signal level compared to the microphones for the other seats. Typically, acoustic cross-talk couplings between the spatial zones in the car ("cross-talk") are at least in the range of about −6 dB (depending on the placement of the microphones, the position of the speaker and further room acoustic parameters).

The system is also configured with a virtual assistant. The terms "virtual assistant," "digital assistant," "intelligent automated assistant," or "automatic digital assistant" can refer to any information processing system that can interpret natural language input in spoken and/or textual form to infer user intent, and perform actions based on the inferred user intent. For example, to act on an inferred user intent, the system can be configured to one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant is configured to accept a user request at least partially in the form of a natural language command, request, statement, narrative, and/or inquiry. Typically, the user request seeks either an informational answer or performance of a task by the virtual assistant.

As shown in FIG. 2B, a virtual assistant can be implemented according to a client-server model. The virtual assistant can include a client-side portion 220 executed on a user device such as a vehicle control system computing device 200, and a server-side portion executed on a server system 280. The vehicle control system computing device 200 can communicate with a server system 280 through one or more networks 20, which can include the Internet, an intranet, or any other wired or wireless public or private network.

The client-side portion executed on the vehicle control system computing device 200 can provide client-side functionalities, such as user-facing input and output processing and communications with server system 280. Server system 280 can provide server-side functionalities for any number of clients residing on a respective user device.

Server system can include one or more virtual assistant servers 281 that can include a client-facing I/O interface 284, one or more processing modules, data and model storage 283, and an I/O interface to external services. The client-facing I/O interface 284 can facilitate the client-facing input and output processing for virtual assistant server. The one or more processing modules can utilize data and model storage 283 to determine the user's intent based on natural language input, and can perform task execution based on inferred user intent. Virtual assistant server 281 can include an external services I/O interface configured to communicate with external services 30, such as telephony services, calendar services, information services, messaging services, navigation services, and the like, through network(s) 20 for task completion or information acquisition. The I/O interface 285 to external services 30 can facilitate such communications.

Server system 280 can be implemented on one or more standalone data processing devices or a distributed network of computers. In some examples, server system 280 can employ various virtual devices and/or services of third party service providers (e.g., third-party cloud service providers) to provide the underlying computing resources and/or infrastructure resources of server system.

Although the functionality of the virtual assistant is described in as including both a client-side portion 220 and a server-side portion 281, in some examples, the functions of an assistant (or speech recognition in general) can be implemented as a standalone application installed on a user device or vehicle control system 200. In addition, the division of functionalities between the client and server portions of the virtual assistant can vary in different examples.

Figure 3:
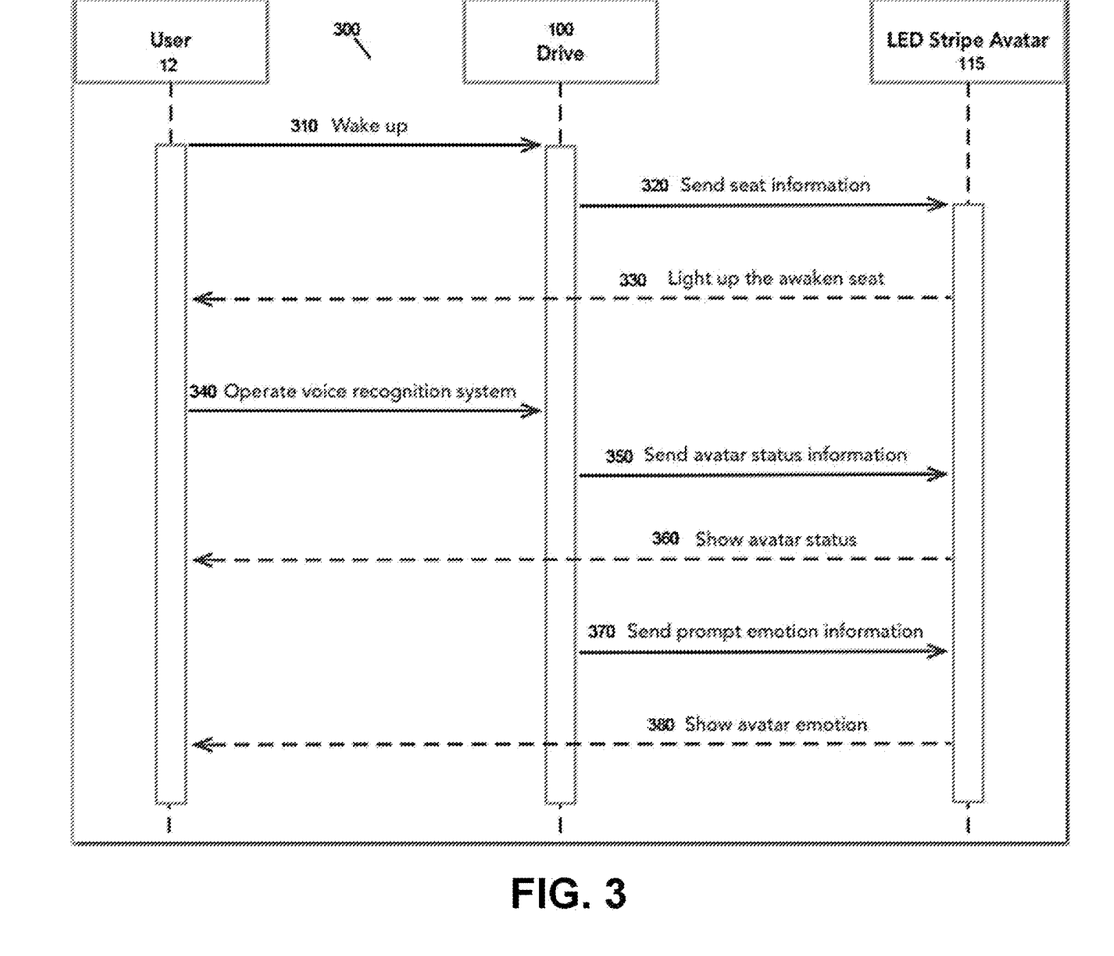
FIG. 3 is logic flow diagram of an example method according to the present disclosure.

FIG. 3 illustrates a logic flow 300 of an example method according to the present disclosure. The functionality of logic flow 300 can be performed by (i) a single computing entity, e.g., computing unit 200 of system 100, or (ii) in a distributed manner. In the latter case, portions of the structure and/or operations of logic flow 300 are performed across multiple computing platforms and/or entities using a distributed system architecture, e.g., a master-slave architecture, a client-server architecture, a peer-to-peer architecture, a shared database architecture, and the like. The embodiments are not limited in this context.

At step 310, a user such as user 12 speaks a wake up or voice command detected by one of the microphones such as microphone 114, which is used to signal the system or drive 100 to wake up. The wake up command spoken by the user can be a phrase such as "hello" in various languages. The microphone closest to and in the zone of the speaker sends the signal to system 100. System 100 is able to identify which zone the signal was received from. For example, a signal received from microphone 114 in zone 110 indicates the speaker is user 12 and is the driver.

In some embodiments, at step 301, a trigger can be used to detect a speech zone. Exemplary non-limiting triggers include a Coherence-to-Diffuse-Ratio that indicates proximity of the microphone to the speaker, relative time delays between microphones, a Signal-to-Noise-Ratio smoothed over time, zone activity detection based on voice biometrics, or visual information provided by a camera or another sensor (not shown) configured to provide information regarding the spatial zone position of an active speaker.

In some embodiments, where an algorithm related to a camera extracts activity information of the zone dedicated speaker based on visual information, a camera can be used for the trigger.

At step 320 the system 100 sends zone or seat information to an avatar such as LED avatar 115. The LED avatar can be any one of the LED avatars in the vehicle, depending on which user is the speaker or which zone needs information based on the voice input. For example, where user 12 is the driver and the speaker, LED avatar 115 in zone 110 is sent the seat information at step 320, which the same zone as the speaker.

At step 330, in response to receiving the zone or seat information, the LED avatar lights up in the zone corresponding to the zone of the user 12. For example, LED avatar 115 lights up in zone 110 to indicate that the voice assistant is active or listening for a voice command in zone 110 from speaker user 12.

In some embodiments the LED avatar in the active area or zone can light up with a low brightness to indicate that the voice assistance is active in that zone.

At step 340, a user issues voice commands to the voice assistant to operate a voice recognition system. A user can operate the voice recognition system as known in the art, by issuing various commands, to command the voice assistant to operate any number of vehicle operations and systems. For example, voice assistants are configured to perform operations such as switching radio stations, opening or closing a specific window, locking the vehicle, calling a specific person, or adjusting or enter a destination into the navigation system. The voice commands are received by system 100 through a microphone that is in the same zone as the user.

At step 350, system 100 sends avatar status information and command to an LED avatar. Avatar status information can include statuses any number of statuses such as, for example, listening, processing, snoozing, or idle. For example, when user 12 speaks a voice command at step 340, the system 100 sends an avatar status information corresponding to the status "listening" to LED avatar 115.

In some embodiments, when system 100 sends the status "listening" to an LED avatar, the system is configured to control the brightness of the LED. The system can be further configured to vary the brightness based on speaker input to the system. For example, in a "listening" status configuration, the system can be configured to dim or brighten the LED to correspond to the volume of a user's voice. In some embodiments, the LEDs can be configured to dim when the volume of a user's voice decreases and brighten when the volume of a user's voice increase.

In some embodiments, when the avatar status is "processing", the system 100 can be configured to light an avatar having an LED strip or series of LED lights from a left end of the LED lights to a right end of the LED lights. The LED lights that light up first will also fade first.

The system can the be configured to light LED lights the right end to the left end. This sequence can repeat while the avatar status information is "processing". In some embodiments, the processing status can indicate that the system 100 received a voice command, is currently processing the request.

In some embodiments when the avatar status is "snoozing", the system 100 can be configured to change the brightness of the LED avatar low to high and then from high to low and repeat this sequence while the avatar status is "snoozing".

In some embodiments when the avatar status is "idle", the system 100 can be configured to turn the LED avatar off so no light is emitted.

In some embodiments, the system can be configured to operate a haptic feedback avatar device to send vibrations to the seat in the zone the user is in, based on the avatar status information.

Accordingly, at step 360, the system 100 is configured to operate LED or other avatar, for example as described above, based on the avatar information received from system 100 in step 350.

In some embodiments, at step 370 the system 100 can be configured to provide emotion information to an LED avatar in the zone of the user to indicate a particular emotion. In some embodiments the emotion is related to the voice command issued by the user in step 340, and the result of the processed request or command. For example, if the voice command issued by the user at step 340 is "go home", the system 100 can be configured to enter the known address of the user in the system's navigation. If the amount of time for the user to arrive at the destination is greater than usual due to traffic, the system 100 can be configured to send emotion information indicating an angry state to the LED avatar in the zone of the user. For example, the system can be configured to command the LED to emit a red light based on the "angry" emotional prompt.

In some embodiments the system 100 can detect the user's emotional state through the voice data received from the microphone in the user's zone. In some embodiments system 100 can detect the user's emotional state through visual information received from a camera within the vehicle. In some embodiments system 100 can send emotion information related to the user's current emotional state to an LED avatar. For example, if the system 100 detects the user is upset, the system 100 can be configured to send the emotion information indicating the user's angry state to the LED avatar. In some embodiments the LED avatar can be configured provide certain lighting to calm the user when the user is upset, for example a soft blue light.

In some embodiments emotion information is obtained or generated through natural language understanding (NLU) algorithms. For example, the system 100 can be configured with an NLU system configured to perform sentiment analysis as known in the art. In some embodiments, the system can also be configured to perform emotion recognition, for example using facial tracking recognition systems and emotion recognition software.

At step 380, the LED avatar can be configured to display lighting corresponding to the emotion information received from system 100 at step 370.

For example, as described above, the system can be configured to so that the LED avatar lights up with a red color to indicate anger based on a "anger" prompt at step 370. If the emotion information is "calm" the LED can light up to a blue color to show a calm state.

It should be understood that elements or functions of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

When a certain structural element is described as "is connected to", "is coupled to", or "is in contact with" a second structural element, it should be interpreted that the second structural element can "be connected to", "be coupled to", or "be in contact with" another structural element, as well as that the certain structural element is directly connected to or is in direct contact with yet another structural element.

It should be noted that the terms "first", "second", and the like can be used herein to modify various elements. These modifiers do not imply a spatial, sequential or hierarchical order to the modified elements unless specifically stated.

As used herein, the terms "a" and "an" mean "one or more" unless specifically indicated otherwise.

As used herein, the term "substantially" means the complete or nearly complete extent or degree of an action, characteristic, property, state, structure, item, or result. For example, an object that is "substantially" enclosed means that the object is either completely enclosed or nearly completely enclosed. The exact allowable degree of deviation from absolute completeness can in some cases depend on the specific context. However, generally, the nearness of completion will be to have the same overall result as if absolute and total completion were obtained.

As used herein, the term "about" is used to provide flexibility to a numerical range endpoint by providing that a given value can be "a little above" or "a little below" the endpoint. Further, where a numerical range is provided, the range is intended to include any and all numbers within the numerical range, including the end points of the range.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein.

The operation of certain aspects of the present disclosure have been described with respect to flowchart illustrations. In at least one of various embodiments, processes described in conjunction with FIGS. 1 to 3 can be implemented by and/or executed on a single network computer. In other embodiments, these processes or portions of these processes can be implemented by and/or executed on a plurality of network computers. Likewise, in at least one of the various embodiments, processes or portions thereof, can operate on one or more client computers, such as client computer. However, embodiments are not so limited, and various combinations of network computers, client computers, virtual machines, or the like can be used. Further, in at least one of the various embodiments, the processes described in conjunction with the flowchart illustrations can be operative in system with logical architectures, such as those described in herein.

It will be understood that each block of the flowchart illustrations described herein, and combinations of blocks in the flowchart illustrations, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present disclosure.

Accordingly, blocks of the flowchart illustrations support combinations for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions. The foregoing examples should not be construed as limiting and/or exhaustive, but rather, as illustrative use cases to show an implementation of at least one of the various embodiments of the present disclosure.

The invention claimed is:

1. A method comprising using a vehicle's voice assistant, said voice assistant being an interactive voice assistant, wherein said vehicle comprises plural zones, each of which is associated with a corresponding microphone and a corresponding avatar, wherein using said vehicle's voice assistant includes:
   receiving a speech signal from a microphone in a zone of said vehicle, said signal including a command or question uttered by a speaker in said zone, said zone being one of a plurality of zones in said vehicle, each of which has a corresponding microphone;
   sending zone information to an avatar associated with the zone, the avatar being one of a plurality of avatars, each of which is associated with a corresponding one of said zones; and
   controlling a lighting display of the avatar device to indicate a status of said vehicle's voice assistant, said status being one of a plurality statuses.

2. The method of claim 1, wherein each of said lighting display comprises an LED and wherein said avatar comprises an LED, and wherein controlling said lighting display comprises changing illumination of said LED.

3. The method of claim 1, wherein sending the zone information comprises determining which avatar to activate based on which microphone detected said speech signal.

4. The method of claim 1, further comprising determining which avatar to activate, wherein determining which avatar to activate comprises doing so based on proximity of said microphone to said speaker as determined by visual information provided by a camera or another sensor configured to provide information regarding a zone in which said speaker is situated.

5. The method of claim 1, wherein controlling the lighting display of the avatar comprises lighting the lighting display using a lighting configuration that indicates that the voice assistant system is active or is listening for a further voice command from the speaker.

6. The method of claim 1, wherein controlling the lighting display comprises choosing a lighting configuration that indicates said status and using said lighting configuration to control said lighting display.

7. The method of claim 1, further comprising determining which avatar to activate, wherein determining which avatar to activate comprises doing so based on proximity of said microphone to said speaker as determined by a signal-to-noise ratio smoothed over time.

8. The method of claim 1, wherein controlling said lighting display comprises controlling a brightness and an activation sequence of LED lights of said avatar, wherein said combination of said brightness and said activation sequence is indicative of said status.

9. The method of claim 1, further comprising, based on the status, vibrating a seat in the zone associated with the speaker.

10. The method of claim 1, wherein controlling the lighting display of the avatar device further comprises controlling the lighting display of the avatar device to indicate emotion information associated with an executed activity of the voice assistant system.

11. The method of claim 1, wherein controlling the lighting display to indicate the emotion information comprises controlling the lighting display to indicate an angry emotion in response to a determination that an amount of time to arrive at a destination specified by the speaker is greater than usual, the among of time having been computed by a navigation system coupled to the voice assistance system.

12. The method of claim 1, wherein controlling the lighting display of the avatar device further comprises using a natural-language understanding system to obtain information concerning the speaker's emotional state and controlling the lighting display of the avatar device to indicate the speaker's emotional state.

13. The method of claim 1, further comprising: determining the speaker's emotion state based on visual information of the speaker obtained from a camera in the vehicle.

14. The method of claim 1, further comprising determining which avatar to activate based on relative time delays between said microphone and one or more other microphones in said vehicle.

15. The method of claim 1, further comprising determining which avatar to activate based on a coherence-to-diffuse ratio that indicates proximity of said microphone to said speaker.

16. The method of claim 1, further comprising determining which avatar to activate based on zone activity detection based on voice biometrics.

17. The method of claim 1, further comprising determining which avatar device to activate based on the detection of the speech signal component, wherein determining which avatar device to activate comprises: determining proximity of at least one microphone from the plurality of microphones based on coherence-to-diffuse ratio that indicates proximity of the at least one microphone to the speaker.

18. The method of claim 1, wherein controlling the lighting display comprises receiving, from a navigation system, information indicating a delay in arriving at a destination specified by said speaker and causing said lighting display to indicate anger in response to said delay.

19. A manufacture comprising a non-transitory computer readable medium having encoded thereon instructions that case a processor to implement a voice assistant in a vehicle, said voice assistant being an interactive voice assistant, wherein said instructions are configured to cause said processor: to receive a speech signal from a microphone in a zone of said vehicle, said signal including a command or a question uttered by a speaker in said zone, said zone being one of a plurality of zones in said vehicle, each of which has a corresponding microphone; to send zone information to an avatar associated with said zone, said avatar being one of a plurality of avatars, each of which is associated with a corresponding one of said zones; and to control a lighting display of said avatar to indicate a status of said vehicle's voice assistant, said status being one of a plurality of statuses.

20. A system comprising: a voice assistant for a vehicle, said voice assistant being an interactive voice assistant, avatars, each of which is associated with one of said zones, and a controller configured: to receive a speech signal from a microphone in a zone of said vehicle, said signal including a command or a question uttered by a speaker in said zone, said zone being one of a plurality of zones in said vehicle, each of which has a corresponding microphone; to send zone information to an avatar associated with said zone, said avatar being one of a plurality of avatars, each of which is associated with a corresponding one of said zones; and to control a lighting display of said avatar to indicate a status of said vehicle's voice assistant, said status being one of a plurality of statuses.

* * * * *